United States Patent [19]

Roberts

[11] Patent Number: 4,604,035
[45] Date of Patent: Aug. 5, 1986

[54] SUBMERSIBLE PUMP HAVING FRANGIBLE DRIVE CONNECTION

[75] Inventor: James R. Roberts, Grayslake, Ill.

[73] Assignee: A. O. Smith Harvestore Products, Inc., Arlington Heights, Ill.

[21] Appl. No.: 688,258

[22] Filed: Jan. 2, 1985

[51] Int. Cl.⁴ .......................... F04B 9/00; F16D 9/00; F03B 13/00
[52] U.S. Cl. ........................................ 417/319; 403/2; 403/260; 415/121 B; 241/185 A; 241/32
[58] Field of Search .................. 417/313, 319; 418/69; 416/2; 415/9, 121 B; 403/2, 260; 192/150; 241/32, 185 A

[56] References Cited

U.S. PATENT DOCUMENTS

| | | | |
|---|---|---|---|
| 1,865,438 | 7/1932 | Friedemann | 192/150 |
| 2,666,394 | 1/1954 | Sadler et al. | 403/2 |
| 2,918,876 | 12/1959 | Howe | 415/121 B |
| 2,936,774 | 5/1960 | Holley, Jr. et al. | 417/319 |
| 3,224,376 | 12/1965 | Schade | 415/121 B |
| 3,961,758 | 6/1976 | Morgan | 415/121 B |
| 4,108,386 | 8/1978 | Conery et al. | 241/185 A |
| 4,378,093 | 3/1983 | Keener | 415/121 B X |
| 4,402,648 | 9/1983 | Kretschmer | 415/121 B |
| 4,527,947 | 7/1985 | Elliot | 415/121 B |

FOREIGN PATENT DOCUMENTS 1301957 8/1969 Fed. Rep. of Germany ... 415/121 B
2901638 8/1979 Fed. Rep. of Germany ... 415/121 B Primary Examiner—William L. Freeh
Assistant Examiner—Paul F. Neils
Attorney, Agent, or Firm—Andrus, Sceales, Starke & Sawall

[57] ABSTRACT

A submersible motor pump assembly having an improved driving connection between the motor and pump. The motor shaft and pump shaft are disposed in end-to-end relation and a bolt extends through an axial passage in the pump shaft and the projecting end of the bolt is threaded in an axial opening in the end of the motor shaft. The outer or opposite end of the pump shaft is formed with a recess that communicates with the passage and the head of the bolt is fixed against rotation with respect to the pump shaft by a bolt retainer which is disposed with the recess. A shear pin interconnects the mating ends of the two shafts to provide a driving connection. The hand of the thread on the bolt is such that rotation of the motor shaft, after shearing of the shear pin, will cause the bolt to be unthreaded from the motor shaft to prevent locking up of the shafts.

8 Claims, 5 Drawing Figures

SUBMERSIBLE PUMP HAVING FRANGIBLE DRIVE CONNECTION

BACKGROUND OF THE INVENTION

In manure storage systems, manure from barn or livestock feed areas is delivered to a pit and mixed with water. The manure slurry is agitated and homogenized in the pit by a pump which can be raised and lowered in the pit and rotated to thoroughly mix or homogenize the slurry. The manure slurry can then be pumped from the pit by the pump to a manure storage tank or to a mobile spreader.

The conventional manure pump has a downwardly facing inlet through which the slurry is drawn into the pump, and because the slurry contains stringy and chunky materials, the pump incorporates a chopping mechanism to chop or comminute these materials.

A common type of motor-pump unit used in a manure system is a submersible type in which the motor is directly connected to the pump and is located within the pit and is normally submerged in the slurry. As the manure slurry can frequently contain hard objects such as rocks, cattle neck chains, barn cleaning paddles, and the like, these objects can cause jamming of the pump. To prevent damage to the drive mechanism in situations where the pump has jammed, a shear pin mechanism normally interconnects the motor shaft with the pump shaft and is arranged to fracture if excessive torque is applied to the shafts.

SUMMARY OF THE INVENTION

The invention is directed to a submersible motor-pump unit and more particularly to a submersible motor-pump unit having an improved driving connection between the motor and pump. In accordance with the invention the motor shaft and pump shaft are located in end-to-end relation and are connected by a bolt that projects from the end of the pump shaft and is threaded in an axial opening in the end of the motor shaft. The inner end of the pump shaft is formed with an axial passage which receives the stem of the bolt, while the outer end of the pump shaft is formed with a recess that communicates with the passage. A bolt retainer is removably secured within the recess and has a non-circular opening which receives and complements the head of the bolt so that the bolt will be fixed against rotation relative to the pump shaft.

A longitudinally extending shear pin, spaced radially of the bolt, interconnects the two shafts to provide a driving connection.

In the event the shear pin should fracture due to an excessive load being encountered by the pump shaft, the motor shaft will continue to rotate, but rotation will not be transmitted to the pump shaft. The hand of the thread of the bolt is such that continued rotation of the motor shaft will cause the bolt to back out of threaded engagement with the motor shaft, with the head of the bolt moving axially within the opening in the bolt retainer. This construction prevents the bolt and pump shaft from locking up on the motor shaft due to continual rotation of the motor shaft after shearing of the pin.

To replace a fractured shear pin, the pump shaft, which is keyed to the impeller, is removed from the pump casing and the fractured pin halves are removed from the pump shaft and motor shaft and a new pin is inserted in the shear pin hole in the pump shaft. The bolt retainer is then removed from the recess in the pump shaft to expose the head of the bolt and the pump shaft is then positioned in end-to-end relation with the motor shaft and the projecting end of the shear pin is inserted in the shear pin hole in the motor shaft. The bolt is then threaded down to connect the pump shaft and motor shaft, and the bolt retainer is then replaced which will cause the bolt to be fixed to the pump shaft.

The construction of the invention enables the shear pin to be replaced without the necessity of removing the chopper plates or the pump impeller. This substantially reduces the time necessary for replacement of a shear pin.

The thread on the bolt is designed so that continual rotation of the motor shaft, after fracture of the shear pin, will cause the bolt to back out of its threaded connection with the motor shaft, thereby preventing possible lockup of the threaded connection.

The construction of the invention also incorporates a bushing between the motor shaft and the pump impeller, so that in the event of fracture of the shear pin, the rotating motor shaft will be journalled in the bushing to prevent possible galling of the impeller.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
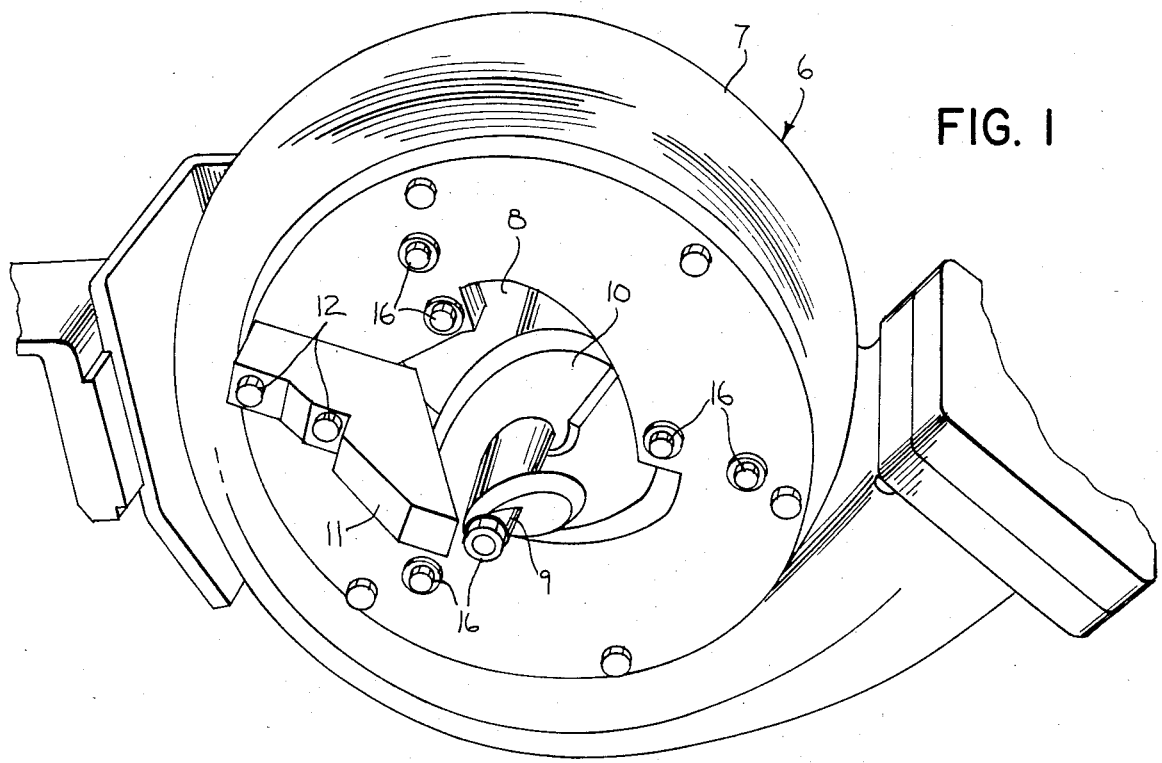
FIG. 1 is a perspective view showing the bottom surface of the pump.

The drawings illustrate a submersible motor-pump unit which has particular application for agitating and pumping a manure slurry or other material containing heavy solids or foreign materials. The motor-pump unit comprises a motor 1 including a housing 2 and the drive shaft 3 of the motor is connected through an adapter 4 to a stub shaft 5 which projects into the upper end of the pump 6.

Pump 6 includes an outer casing 7 having a central inlet 8 in its lower surface through which the liquid, or other material being pumped, is introduced into the pump. Pump shaft 9 is disposed in end-to-end relation with shaft 5 and a tapered auger 10 is formed integrally with the lower end of pump shaft 9. As best shown in FIG. 1, the lower end of the tapered auger 10 projects downwardly through the inlet 8 and the auger aids in feeding the slurry through the inlet opening 8 to the pump.

To prevent stringy material from being entwined on the auger, a scraper blade 11 is secured to the lower portion of the pump casing by bolts 12. The inner edge of plate 11 is located in close proximity to the flight of auger 10 to scrape materials from the auger flight.

Figure 5:
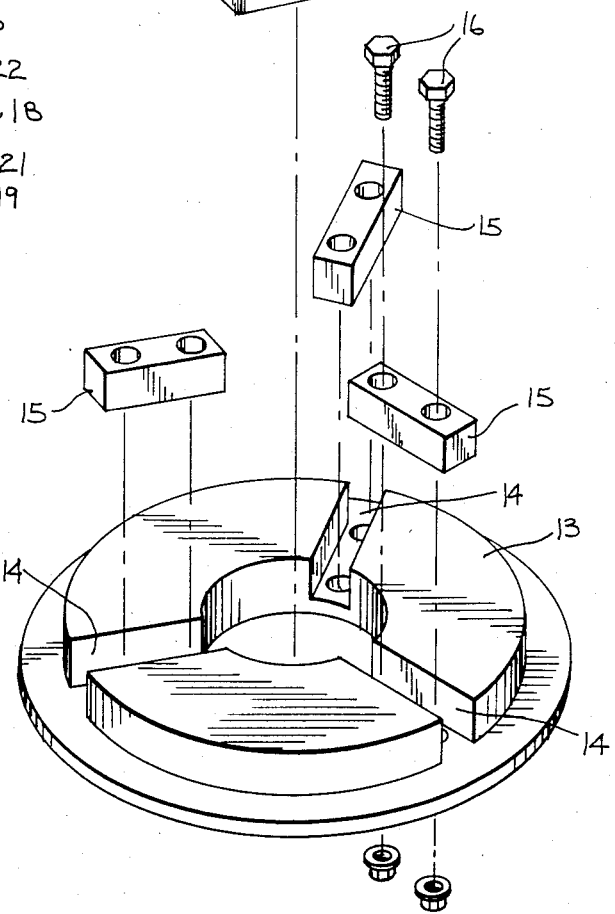
FIG. 5 is an exploded view showing the chopper mechanism.

The pump also includes a chopper mechanism which acts to chop or comminute chunky or stringy materials. The chopper mechanism includes an annular chopper plate 13 which is mounted within the inlet opening 8 of the pump casing and the upper surface of chopper plate 13, as best illustrated in FIG. 5, contains three radially extending recesses 14. A chopper insert 15 is secured within each recess 14 by bolts 16.

Cooperating with the chopper inserts 15 is a rotatable chopper block 17 which rotates with pump shaft 9. The outer periphery of chopper block 17 cooperates with the inner surfaces of inserts 15 to aid in chopping or cutting stringy or chunky materials.

Positioned above chopper block 17 is a second chopper block 18 which is secured to chopper block 17 by a pair of keys 19. Keys 19 are received in the recesses 20 in the upper surface of chopper block 17 and in recesses 21 in the lower surface of chopper block 18. Chopper block 18 also has corresponding recesses 22 in its upper surface so that the block 18 can be reversed in its position to compensate for wear.

Figure 2:
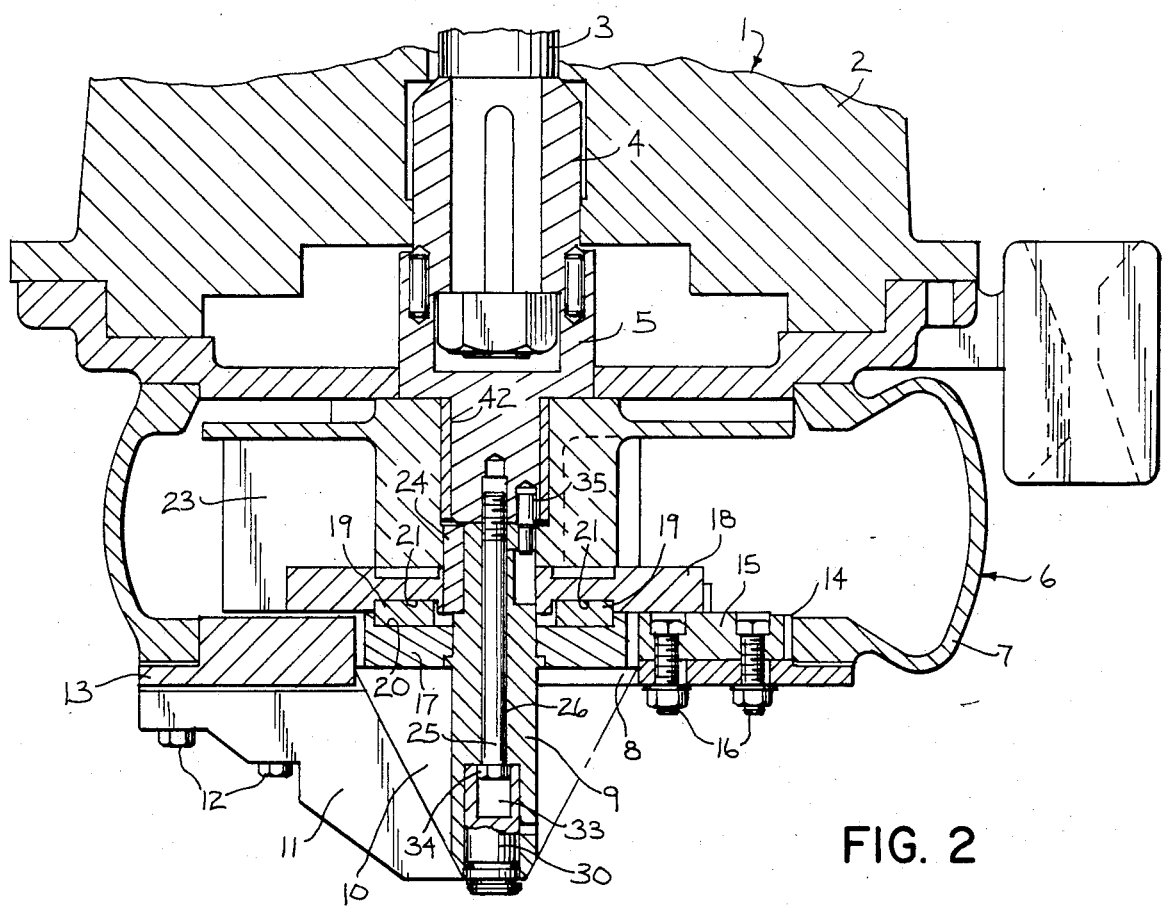
FIG. 2 is a fragmentary vertical section showing the motor and pump construction.

As shown in FIG. 2, the lower surface of chopper block 18 cooperates with upper surfaces of inserts 15 to further comminute material being drawn into the pump.

Pump 6 also includes an impeller 23 and both the impeller and the upper chopper block 18 are secured to the shaft 9 through key 24. With this construction, impeller 23, chopper blocks 17 and 18, and auger 10 will rotate with the pump shaft 9.

In accordance with the invention, a bolt 25 extends through an axial passage 26 in shaft 9 and the upper end 27 of bolt 25 is engaged in a threaded axial opening 28 in the end of shaft 5.

The lower end of shaft 9 is provided with an enlarged axial recess 29 and a bolt retainer 30 is removably secured within recess 29 by a pair of set screws 31. The joint between the bolt retainer 30 and recess 29 is sealed by an O-ring 32.

Figure 3:
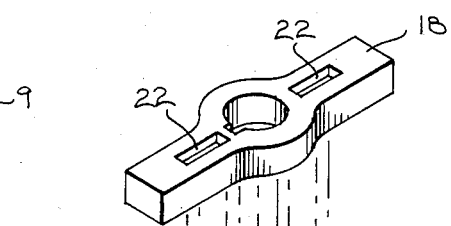
FIG. 3 is an enlarged longitudinal section showing the bolt connection of the pump shaft to the motor shaft.
Figure 4:
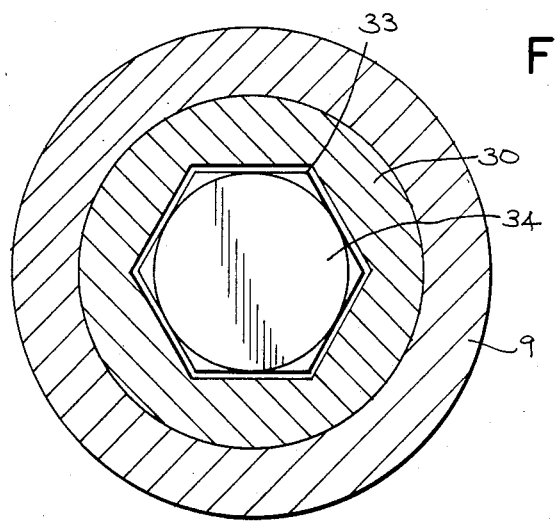
FIG. 4 is a section taken along line 4—4 of FIG. 3.
Figure 4:
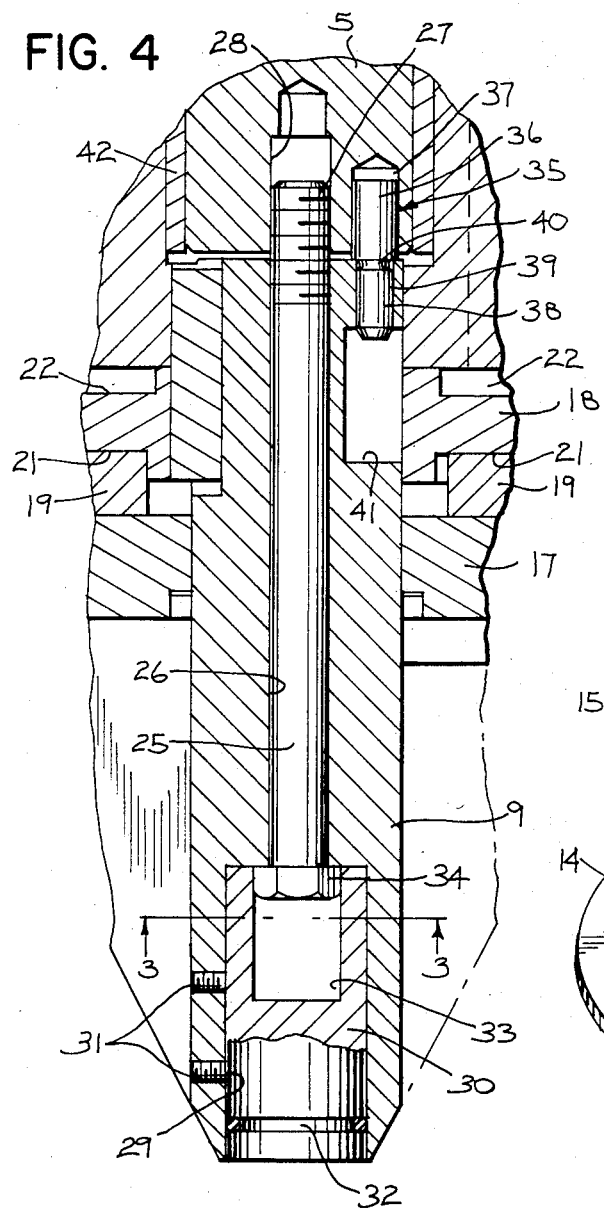

As best shown in FIG. 4, the upper end of bolt retainer 30 is provided with a recess 33 which receives the head 34 of bolt 25. As illustrated in FIG. 3, recess 33 has a hexagonal cross section to complement the cross section of head 34, so that the bolt will be fixed against rotation with respect to the bolt retainer 30 and shaft 9. Recess 33 has a depth substantially greater than the thickness of head 34, so that head 34 can move axially within recess 33, as will be hereinafter described.

To provide a driving connection between the motor shaft 5 and pump shaft 9, a shear pin 35 interconnects the shafts. Pin 35 is provided with a large diameter upper end 36 which is loosely fitted within a longitudinal hole 37 in shaft 5. Pin 35 also includes a small diameter end portion 38 which is press fitted within a longitudinal hole 39 in shaft 9. As shown in FIGS. 2 and 4, shear pin 35 extends longitudinally of the axes of shafts 5 and 9 and is offset radially with the axes. The central portion of shear pin 35 is provided with a circumferential groove 40 which is located in alignment with the joint between the ends of shafts 5 and 9.

To facilitate removal of the sheared half 38 of pin 35, shaft 9 is provided with a recess 41 that communicates with the hole 39.

In the event the pump encounters an overload condition, causing shear pin 35 to fracture, shaft 5 will continue to rotate, while pump shaft 9, along with the chopper block 17 and 18 and impeller 23 will cease rotation. To prevent galling of the impeller 23 under these conditions, a bushing 42 is secured to the inner periphery of impeller 23 and serves to journal the rotating shaft 5.

The hand of the thread on end 27 of bolt 25 is such that continual rotation of motor shaft 5, after fracture of shear pin 35, will cause bolt 25 to be threaded out of the opening 28. As auger 10 cannot move downwardly due to engagement with the scraper plate 11, the bolt 25 will be backed out of the opening with head 34 moving downwardly within recess 33 in bolt retainer 30 until the bolt is completely disengaged from shaft 5. This construction prevents bolt 25 from locking up on shaft 5 due to continuous rotation of shaft 5 after fracture of shear pin 35.

To replace the fractured shear pin, the scraper plate 11 is removed by disengaging bolts 12 and the auger 10 and shaft 9 can then be withdrawn from the pump casing. As the upper end 36 of shear pin 35 is loosely fitted within hole 37 in shaft 5, the fractured section 36 will fall from the hole as the pump shaft is removed. The small diameter section 38 of the sheared pin 35 can then be driven inwardly into recess 41 by a suitable tool and removed.

To replace the shear pin, the small diameter end 38 of pin 35 is inserted within hole 39 in the end of pump shaft 9 and the bolt retainer 30 is removed to expose the head 34 of the bolt 25. Pump shaft 9 is then positioned in end-to-end relation with shaft 5 and the large diameter end 36 of shear pin 35 is inserted within hole 37. Bolt 35 is then threaded in the opening 28 in shaft 5 by engaging the exposed head 34 of the bolt with a socket wrench. After the bolt 35 has been turned down, the bolt retainer 30 is positioned in the recess 29, with bolt head 34 being received in recess 33 of the bolt retainer, and the set screws 32 are engaged to lock the bolt retainer to shaft 9.

With the invention, the shear pin can be readily replaced without the necessity of removing the chopper plate 13, chopper block 18, and impeller 23. This substantially reduces the time involved in replacing the shear pin over conventional submersible pump constructions.

Because of the nature of the threaded connection of bolt 25 with shaft 5, the bolt 25 will be automatically disengaged from the motor shaft 5 on fracture of the shear pin 35, to thereby prevent any possibility of the bolt locking up on the motor shaft.

Various modes of carrying out the invention are contemplated as being within the scope of the following claims particularly pointing out and distinctly claiming the subject matter which is regarded as the invention.

I claim:

1. In a submersible motor pump unit, a pump casing, an impeller disposed within the casing, a pump shaft connected to the impeller, a motor having a motor shaft, said pump shaft and said motor shaft being disposed in end-to-end relation, shear pin means interconnecting said shafts, one end of said motor shaft having an axial threaded opening, said pump shaft having an axial passage, a bolt slidably disposed in said passage, one end of said bolt having a head and the opposite one end of said bolt projecting outwardly of said passage and being threaded in said axial opening, and means to prevent rotation of said bolt relative to said pump shaft, fracture of said shear pin means and continued rotation of said motor shaft causing said bolt to unthread from said axial opening and moving axially relative to said pump shaft.

2. The pump assembly of claim 1, wherein said shear pin means comprises a shear pin disposed longitudinally of the axes of said shafts and disposed within aligned holes in the respective ends of the motor shaft and the pump shaft.

3. The unit of claim 1, and including journalling means disposed between said motor shaft and said impeller to journal said motor shaft relative to said impeller on fracture of said shear pin.

4. The assembly of claim 1, wherein said pump includes a fixed casing and said assembly includes means connected to said casing to prevent axial displacement of said pump shaft from said pump casing on unthreading of said bolt from said opening.

5. The assembly of claim 4, wherein said pump casing includes a downwardly facing inlet opening and said pump includes an auger connected to said pump shaft and extending downwardly through said opening, said means to prevent complete displacement of said pump shaft comprising a scraper plate secured to said casing and having an edge disposed in close proximity to said auger.

6. The assembly of claim 1, wherein said pump shaft is provided with a cavity communicating with said passage, and said means to prevent rotation comprises a bolt retainer secured within said cavity and having an upwardly facing recess to receive the head of the bolt, said bolt head and said recess having non-circular complementary cross sections to prevent relative rotation between the bolt and the bolt receiver.

7. The assembly of claim 6, wherein said recess has a greater axial depth than the depth of said bolt head whereby said bolt head can move axially within said recess as said bolt is unthreaded from said axial opening.

8. In a submersible motor pump unit, a pump casing having a lower axial inlet, an impeller rotatably disposed within the casing, a pump shaft connected to the impeller, a motor having a motor shaft, said pump shaft and said motor shaft being disposed in end-to-end relation, a shear pin disposed longitudinally of the axes of said shafts and disposed in aligned holes in the mating ends of said shafts, said shear pin being offset radially from said axes, an end of said motor shaft having a threaded opening, the upper end of said pump shaft having an axial passage aligned with said opening and the lower end of said pump shaft having a cavity communicating with said passage and having a larger cross sectional area than said passage, a bolt slidably disposed within said passage, the upper end of the bolt being threaded in said axial opening and the lower end of the bolt having a head, a bolt retainer secured within said cavity and having an upwardly facing recess to receive the head of the bolt, said bolt head and said recess having non-circular complementary cross sections to prevent relative rotation between the bolt and the bolt retainer, said recess having a greater axial depth than the depth of said bolt head, whereby the bolt head can move axially within the recess as the bolt is unthreaded from said axial opening, fracture of said shear pin and continued rotation of said motor shaft causing the bolt to unthread from said axial opening and resulting in axial movement of said bolt relative to said pump shaft and casing.

* * * * *